United States Patent
Cheung et al.

(10) Patent No.: US 6,784,408 B1
(45) Date of Patent: Aug. 31, 2004

(54) ARRAY OF LATERAL EFFECT DETECTORS FOR HIGH-SPEED WAVEFRONT SENSING AND OTHER APPLICATIONS

(75) Inventors: Ken C. K. Cheung, Kailua, HI (US); Ronald J. Hugo, Calgary (CA)

(73) Assignee: Oceanit Laboratories, Inc., Honolulu, HI (US)

( * ) Notice: Subject to any disclaimer, the term of this patent is extended or adjusted under 35 U.S.C. 154(b) by 36 days.

(21) Appl. No.: 10/128,433

(22) Filed: Apr. 24, 2002

Related U.S. Application Data

(60) Provisional application No. 60/285,992, filed on Apr. 25, 2001.

(51) Int. Cl.[7] .................................................. G01J 1/20
(52) U.S. Cl. .................................... 250/201.9; 356/121
(58) Field of Search .......................... 250/201.1, 201.9, 250/206.2, 208.1, 214 R, 216; 356/121, 124–125, 521; 359/244, 557

(56) References Cited

U.S. PATENT DOCUMENTS

| | | | |
|---|---|---|---|
| 4,141,652 A | | 2/1979 | Feinleib |
| 4,399,356 A | * | 8/1983 | Feinleib et al. .......... 250/201.9 |
| 5,233,174 A | | 8/1993 | Zmek |
| 5,287,165 A | * | 2/1994 | Ulich et al. .................. 356/121 |
| 5,410,397 A | * | 4/1995 | Toeppen ...................... 356/121 |
| 5,629,765 A | * | 5/1997 | Schmutz ...................... 356/121 |
| 5,912,731 A | | 6/1999 | DeLong et al. |
| 6,163,381 A | * | 12/2000 | Davies et al. ................ 356/521 |
| 6,389,102 B2 | * | 5/2002 | Mazor et al. ................. 378/89 |
| 6,563,947 B1 | * | 5/2003 | Droste ......................... 382/181 |

* cited by examiner

*Primary Examiner*—David Porta
*Assistant Examiner*—Patrick J. Lee
(74) *Attorney, Agent, or Firm*—James Creighton Wray; Meera P. Narasimhan

(57) ABSTRACT

A two-dimensional array of lateral-effect detectors (or position-sensing devices) is used to simultaneously measure multi-point centroidal locations at high speed. It is one of the primary components of a high-speed optical wavefront sensor design comprising a Shack-Hartmann-type lenslet array and associated analog circuitry including analog-to-digital (A/D) converters, and digital micro-processors. The detector array measures the centroidal location of each incident beam emerging from the lenslet array and calculates the local wavefront slope based on the beam deviations from their respective subaperture centers. The wavefront sensor is designed for high temporal bandwidth operation and is ideally suited for applications such as laser-beam propagation through boundary-layer turbulence, atmospheric turbulence, or imperfect optics. The wavefront sensor may be coupled with a deformable mirror as primary components of an adaptive optics system.

43 Claims, 2 Drawing Sheets

ARRAY OF LATERAL EFFECT DETECTORS FOR HIGH-SPEED WAVEFRONT SENSING AND OTHER APPLICATIONS

This application claims the benefit of U.S. Provisional Application No. 60/285,992 filed Apr. 25, 2001.

BACKGROUND OF THE INVENTION

One of the most significant challenges facing directed-energy systems and imaging technologies operated on airborne platforms is the problem of propagating light through an optically active flow field such as an airplane's turbulent boundary layer. The emerging wavefronts are further distorted by atmospheric turbulence and require correction through the use of an adaptive optical system.

In order to correct for the optical aberrations, the wavefront distortions need to be measured at a high temporal bandwidth, and current optical wavefront sensors are limited in speed specifically at the charge-coupled device (CCD) sensor array.

SUMMARY OF THE INVENTION

The invention described herein is an innovative, low-cost technology that significantly increases the temporal bandwidth of conventional optical wavefront sensors by replacing the CCD array with an array of position-sensing devices (PSD), or lateral-effect detectors, described below.

The application of adaptive optical systems to imaging and/or atmospheric propagation problems requires the measurement of optical wavefront distortions prior to correction. Optical wavefront distortions are measured using an optical wavefront sensor, and corrections are applied using a deformable mirror. The sensing and correction process involves a feedback control loop. As with most control problems, it is desirable to sample the optical wavefront at approximately ten times the deformable mirror's cutoff frequency.

The frequency at which a deformable mirror needs to be actuated to correct for transmission through atmospheric turbulence (assumed isotropic and homogeneous) can be estimated by the Greenwood frequency. Ground-based observatories have Greenwood frequencies on the order of 200 Hz, and consequently wavefront sensing requirements, being an order of magnitude higher, are on the order of 2 kHz.

Optical propagation through turbulence from airborne platforms puts more demands on adaptive optical systems, with Greenwood frequencies on the order of 2 kHz and wavefront sensor requirements approaching 20 kHz. The high temporal bandwidth requirement of 20 kHz is not feasible with current-generation optical wavefront sensor technology. As a result, there is a need to develop optical wavefront sensors that can operate at significantly higher temporal bandwidths.

Two of the most commonly used optical wavefront sensor technologies are based on the following methods—AC lateral shearing interferometers and Shack-Hartmann wavefront sensors. Each requires the interrogation of an array of detectors. The shearing interferometer is frequently coupled to an array of photodiodes, whereas the Shack-Hartmann utilizes an array of quad cells or a CCD array. Of the two methods, the Shack-Hartmann is the most advantageous in that it is able to resolve wavefront distortions without encountering the $2\pi$ phase ambiguity problem of an interferometric device. Consequently Shack-Hartmann wavefront sensors are often the preferred sensing method for adaptive optics applications. The main disadvantage to the Shack-Hartmann wavefront sensor is the fact that in order to sense the off-axis position of each subaperture's focal spot it is necessary to interrogate a large number of pixels. Thus, the sensor's temporal bandwidth is limited.

The Shack-Hartmann wavefront sensor consists of an array of lenses (lenslet array) fabricated from a single piece of glass or plastic. Each lens or subaperture, if square, forms a 2-dimensional $sinc^2$ diffraction pattern in the focal plane (commonly referred to as subaperture spot). The aperture size and focal length, which is the same for each lens, is designed to achieve the required resolution and dynamic range of a wavefront slope measurement.

In some of the early Shack-Hartmann wavefront sensor designs, an array of quad cells was used to sense the off-axis position of the diffraction spot from each subaperture. The use of quad cells limits sensor performance in two ways. First, a quad cell can only sense deflections less than or equal to the subaperture spot's diffraction-limited radius. This condition results when the subaperture spot has moved entirely to one side or the other of the quad cell, and further motion would result in no further change in detector signal (i.e., signal saturation).

A second limitation results from the fact that the quad-cell output signal is sensitive to the shape of the subaperture spot, leading to errors under conditions of irregular object shape. In order to circumvent these problems, quad cells were replaced by a CCD array.

A Shack-Hartmann wavefront sensor constructed using a CCD array avoids the problems encountered using quad cells by imaging each subaperture onto a N×N sub-grid of pixels. By choosing a large number of pixels per subaperture, spot deflections larger than the spot's diffraction radius can be measured. The use of center-of-gravity-based centroiding schemes enables accurate determination of deflections even when the irradiance distribution or spot shape from a subaperture is irregular due to higher-order aberrations. These two advantages have led to the use of CCD arrays in place of quad-cell arrays.

Depending on bandwidth, dynamic range and accuracy requirements, anywhere between 5×5 to 10×10 pixel arrays have been used per subaperture. Current-generation, commercially available, CCD-array cameras operate at frame rates approaching 1 kHz, and next-generation research cameras have been described with continuous frame rates as high as 10 kHz. As higher frame rates are considered, the benefits of using a CCD array begin to be offset by the increased number of signals that need to be acquired and processed per second. Higher frame rates have shorter exposure times, leading to a reduction in the overall signal irradiance per pixel. Higher frame rates also result in an increase in analog-to-digital (A/D) converter noise or read noise. Both effects tend to reduce the camera's signal-to-noise ratio (SNR). Consequently, although higher data rate cameras continue to appear on the market, the increased load imposed on data processing schemes limits temporal bandwidth and accuracy of Shack-Hartmann wavefront sensor designs using CCD arrays.

Shack-Hartmann wavefront sensor technology involves a simple optical configuration that is easy to understand and integrate into a system and, as a result, has become well established. Consequently, technology development that builds on the strengths of the Shack-Hartmann design are appealing from both a technical and marketing perspective.

Shack-Hartmann designs using arrays of quad cells are deficient due to limited dynamic range and spot-shape sensitivity. Shack-Hartmann sensor designs using CCD arrays suffer from the large amount of data that needs to be read out and processed, as well as a reduction in SNR as sensor frame rate is increased. A sensor that combines the analog processing speed of the quad cell with the dynamic range and spot-shape independence of the CCD array results in a Shack-Hartmann sensor design with significant improvements in temporal bandwidth. An improved Shack-Hartmann sensor design with these qualities is described herein.

A distant relative of the quad cell is the lateral-effect detector, a position-sensing device. The lateral-effect detector is a large area photodiode, consisting of a square sensing area bounded by four strip terminals. Two independent currents are generated in orthogonal directions between terminals on opposite sides of the active area. When exposed to photons, the lateral-effect detector induces a current flow laterally away from the location of the incident beam. The conductance of the path between the location of the beam and each strip terminal is related to the distance between beam and terminal; therefore greater currents are generated by a beam that is closer to a terminal. Consequently, the current measured from each strip terminal may be used to determine the beam's position on the sensor surface. This results in a voltage signal that is proportional to beam location.

The advantage of a lateral-effect detector over a quad cell is that the signal does not saturate for beam deflections greater than the diffraction spot radius. A second advantage is that the resulting centroidal position is not sensitive to the shape of the incident beam. The lateral-effect detector, like the quad cell, has an advantage over CCD-array-based sensors as fewer signals need to be measured per subaperture, and centroiding operations are performed in analog, reducing data-processing requirements. Thus, it can be seen that the lateral-effect detector possesses some of the best features of both the quad cell and the CCD array.

Construction of a Shack-Hartmann wavefront sensor using an array of lateral-effect detectors is attractive from both a temporal-bandwidth standpoint and from an economic perspective. Considering a 20×20 wavefront-sensor example, replacing the CCD array with an array of lateral-effect detectors results in a reduction in the number of signals to be acquired by a factor of 32. Furthermore, with all of the centroiding calculations performed in analog, data-processing requirements are reduced and logic-circuit construction greatly simplified.

An additional benefit exists as continuous-exposure sensors do not have the signal-to-noise problems associated with the short-integration times of high-clock-rate CCD arrays. It is evident that use of these low-cost, commercially available sensor systems makes the final sensor design very economical, while at the same time solving a large portion of the temporal bandwidth constraints and accuracy limitations associated with current Shack-Hartmann sensor designs.

These and further and other objects and features of the invention are apparent in the disclosure, which includes the above and ongoing written specification, with the drawings.

DETAILED DESCRIPTION OF PREFERRED EMBODIMENTS

Figure 1:
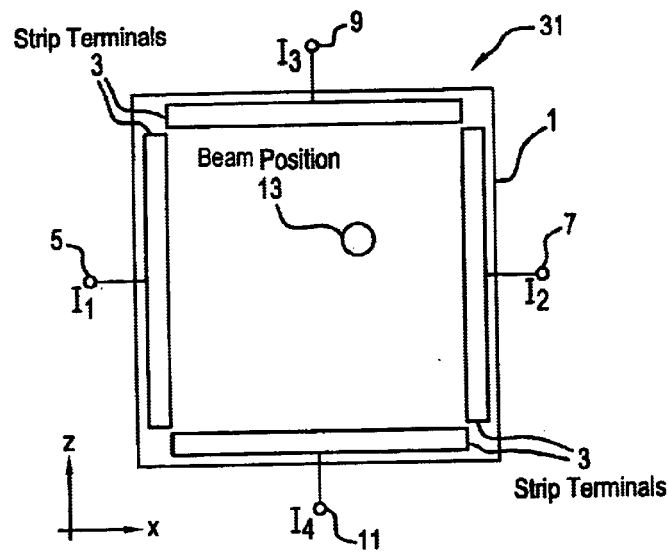
FIG. 1 shows a lateral-effect detector with beam position location.
Figure 2:
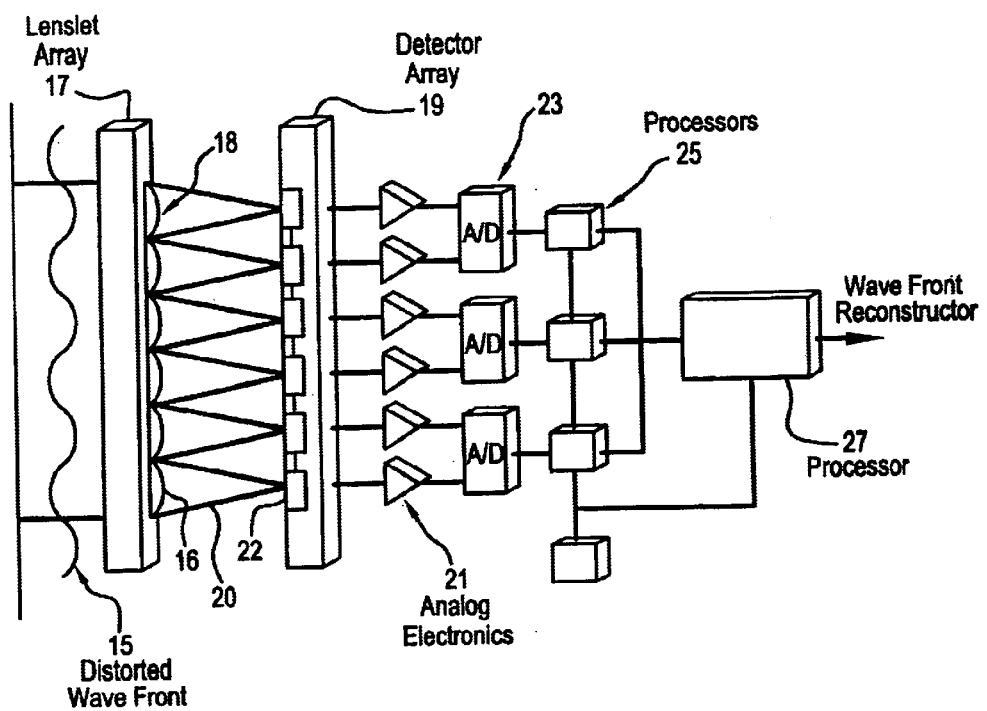
FIG. 2 is a schematic of wavefront sensor components.
Figure 3:
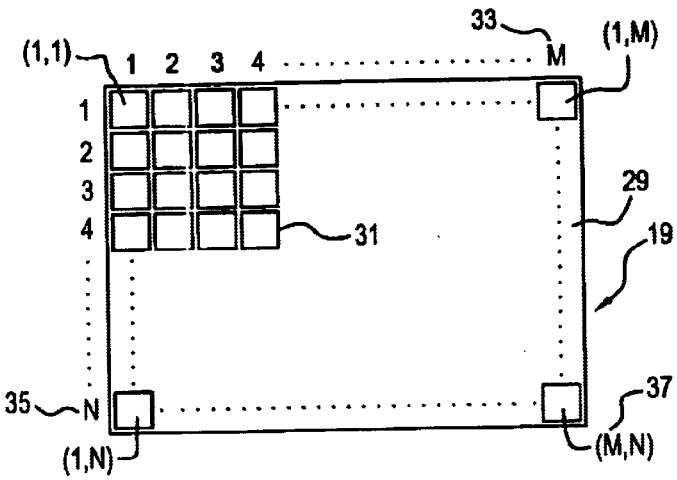
FIG. 3 shows a configuration for an array of lateral-effect detectors.

A preferred embodiment, as shown in FIGS. 1–3, includes one- or multi-dimensional (M×N) array 19 of lateral-effect detectors or position-sensing devices 31. The preferred lateral-effect detectors may be two-dimensional or one-dimensional. The lateral-effect detectors may preferably be mounted on different substrate materials 1 to achieve a range of sensitivities to different wavelengths of light, for example but not limited to, in infrared, visible, ultraviolet. Preferred materials may include, but are not limited to, silicon, germanium, and InGaAs. The lateral-effect detectors may be of different types such as, but not limited to, surface-mount variety, or stand-alone, packaged devices.

FIG. 1 shows a lateral-effect detector 31 on a substrate 1 with strip terminals 3. Output currents are shown at elements 5, 7, 9, 11, respectively corresponding to currents $I_1$, $I_2$, $I_3$, and $I_4$. Light beam location 13 indicates the location on the substrate 1.

As shown in FIGS. 2 and 3, a preferred wavefront sensor includes Shack-Hartmann lenslet array 17, array of lateral-effect detectors or "detector array" 19, and electronic circuitry 21, 23 25. The preferred lenslet array 17 and detector array 19 may be of any two-dimensional geometric configuration M×N 37 where M 33 and N 35 are integers. Generally, the lenslet array 17 and detector array 19 are square, such as N×N, and both have the same number and configuration of subapertures. Each lenslet 18 preferably focuses a light beam 20 on a corresponding detector array subaperture 22.

Electronic circuitry 21 may include amplification circuits, analog devices, analog-to-digital (A/D) converters 23, filters and digital components such as, but not limited to, digital micro-processors, field-programmable logic arrays, digital signal processors, micro-computers 25. The output signals of the detector array and electronics are used to calculate wavefront slopes based on each subaperture beam location relative to detector center.

Wavefront slope calculations may be performed using wave front reconstructor 27 which includes, but is not limited to, digital signal processors and field-programmable logic arrays. Wavefront-slope vectors may be used to reconstruct the incoming wavefront. Wavefront reconstruction may be performed using a variety of methods, for example, but not limited to, modal or zonal methods.

FIG. 2 shows a schematic of wavefront sensor components having distorted wavefront 15, lenslet array 17 with lenslets 18 providing beams 20 on sub-apertures 22 of the lateral-effect detector array 19. Analog electronics 21, A/D converters 23 and digital electronics processors 25, which may include master and slave processors and data ordering processors, enhance the output of the detector and provide output signals to wavefront reconstruction component 27.

FIG. 3 shows a preferred configuration for an array 19 of lateral-effect detectors in which detector substrate 29 has multiple lateral-effect detectors 31, arranged in plural columns M 33 and plural rows N 35 to form a grid-like structure with an array size M×N 37.

Figure 4:
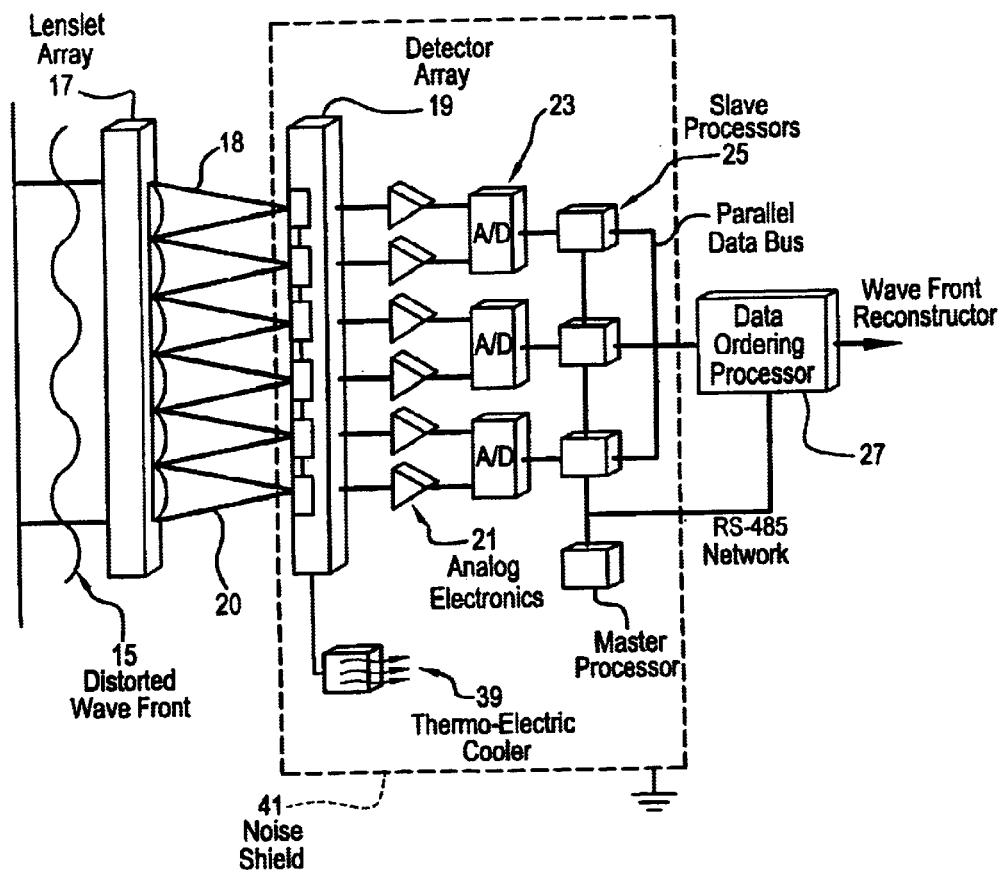
FIG. 4 is the schematic of the wavefront sensor components with a cooler and a shield.

As shown in FIG. 4, the lateral-effect detector array may be cooled to reduce Johnson noise, using thermo-electric coolers 39 or a similar method. Detector array and electronics may be shielded with a shield 41 to reduce or eliminate electro-magnetic noise interference. Lateral-effect detector arrays may be used for other applications, including, but not limited to, multiple target centroid tracking, multiple object range finder.

While the invention has been described with reference to specific embodiments, modifications and variations of the invention may be constructed without departing from the scope of the invention.

We claim:

1. Wavefront sensing apparatus comprising a substrate, a lenslet array coupled to the substrate for focusing radiant energy from the substrate, a lateral-effect detector array for receiving focused radiant energy from the lenslet array, detecting location of the radiant energy on the substrate and generating signals, processors for processing the signals from the detector array, circuitry coupled to the substrate, and is outputs for outputting data relative to the signals processed by the processor.

2. The apparatus of claim 1, further comprising lenslets in the lenslet array and detectors in the detector array.

3. The apparatus of claim 2, further comprising apertures in the lenslets and complementary sub-apertures in the detectors.

4. The apparatus of claim 3, wherein each lenslet focuses the radiant energy on a complementary sub-aperture in a corresponding detector.

5. The apparatus of claim 4, wherein the radiant energy is a light beam.

6. The apparatus of claim 1, wherein the lenslet array comprises a two-dimensional geometric configuration.

7. The apparatus of claim 6, wherein the configuration comprises two dimensions M×N, wherein M and N are integers.

8. The apparatus of claim 6, wherein the configuration is square.

9. The apparatus of claim 1, wherein the detector array comprises a two-dimensional geometric configuration.

10. The apparatus of claim 9, wherein the configuration comprises two dimensions M×N, wherein M and N are integers.

11. The apparatus of claim 9, wherein the configuration is square.

12. The apparatus of claim 1, wherein the detector array is a uni-dimensional or a multi-dimensional array of lateral-effect detectors.

13. The apparatus of claim 12, wherein the lateral-effect detectors are two-dimensional or one-dimensional.

14. The apparatus of claim 12, wherein the lateral-effect detectors comprise different range of sensitivities to different wavelengths of radiant energy.

15. The apparatus of claim 12, wherein the lateral-effect detectors are selected from the group consisting of surface-mount variety, stand-alone, packaged devices, and combinations thereof.

16. The apparatus of claim 12, wherein the multidimensional array of lateral-effect detectors comprises a grid-like structure of multiple lateral-effect detectors disposed in plural columns and plural rows on a detector base.

17. The apparatus of claim 1, wherein the radiant energy is selected from a group consisting of infrared, visible, ultraviolet, and combinations thereof.

18. The apparatus of claim 1, wherein the substrate is selected from a group consisting of silicon, germanium, InGaAs, and combinations thereof.

19. The apparatus of claim 1, wherein the circuitry further comprises amplification circuits for amplifying the signals, analog devices for determining location of the radiant energy, analog-to-digital (A/D) converters for converting the signals, filters for filtering the signals and digital components for processing and outputting data relative to sensed signals.

20. The apparatus of claim 1, further comprising a wavefront reconstructor coupled to the detector array and the processors.

21. The apparatus of claim 20, wherein the reconstructor comprises digital micro-processors, field-programmable logic arrays, digital signal and electronic processors, and micro-computers for computing data relative to the signals processed.

22. The apparatus of claim 21, wherein the digital electronics processors further comprises master and slave processors and data ordering processors for enhancing output of the detector and providing output signals to the wavefront reconstructor.

23. The apparatus of claim 1, wherein the outputs comprise wavefront slopes processed from the signals of the detector array, each wavefront slope corresponding to a location of the radiant energy relative to the apparatus.

24. The apparatus of claim 23, further comprising wavefront slope vectors providing data for wavefront reconstruction.

25. The apparatus of claim 24, wherein the data comprises wavefront reconstruction by a modal method.

26. The apparatus of claim 24, wherein the data comprises wavefront reconstruction by a zonal method.

27. The apparatus of claim 12, further comprising thermo-electric coolers coupled to the detector array for cooling the detectors and for reducing noise.

28. The apparatus of claim 12, further comprising a shield for shielding the detector array and circuitry and reducing or eliminating electro-magnetic noise interference.

29. A multiple target centroid tracking device comprising the apparatus of claim 12.

30. A multiple object range finder device comprising the apparatus of claim 12.

31. Wavefront sensing method comprising providing a wavefront on a substrate, directing beams from the wavefront through lenslets in a lenslet array, directing the beams from the lenslets through sub-apertures of lateral-effect detectors in a lateral-effect detector array, detecting location of the beams on the substrate and generating signals with the detector array, processing the signals from the detector array by processors, and outputting data relative to the signals processed by the processor.

32. The method of claim 31, wherein the processing further comprises using analog electronics, A/D converters and digital electronics processors and enhancing output of the detectors and providing output signals.

33. The method of claim 32, wherein the processing further comprises sensing the output signals, amplifying the signals with amplification circuits, determining location of the radiant energy with analog devices, converting the signals with analog-to-digital (A/D) converters, filtering the signals with filters and outputting data relative to the sensed signals.

34. The method of claim 33, further comprising reconstructing the wavefront by providing the output signals to a wavefront reconstructor.

35. The method of claim 34, wherein the reconstructing further comprises computing data relative to the output signals with digital micro-processors, field-programmable logic arrays, digital signal and electronic processors, and micro-computers in the reconstructor.

36. The method of claim 35, wherein the computing further comprises providing wavefront slopes corresponding to the output signals, and providing a location of the wavefront on the substrate.

37. The method of claim 36, further comprising calculating wavefront slope vectors, determining data corresponding to the wavefront and reconstructing the wavefront.

38. The method of claim 37, wherein the calculating comprises wavefront reconstruction by a modal method.

39. The method of claim 37, wherein the calculating comprises wavefront reconstruction by a zonal method.

40. The method of claim 31, further comprising cooling the detectors and reducing noise with thermo-electric coolers.

41. The method of claim 31, further comprising shielding the detector array and circuitry and reducing or eliminating electro-magnetic noise interference with a shield.

42. The method of claim 31, wherein the sensing comprises tracking a multiple target centroid location.

43. The method of claim 31, wherein the sensing comprises finding a multiple object range location.

* * * * *

UNITED STATES PATENT AND TRADEMARK OFFICE
CERTIFICATE OF CORRECTION

| | |
|---|---|
| PATENT NO. | : 6,784,408 B1 |
| APPLICATION NO. | : 10/128433 |
| DATED | : August 31, 2004 |
| INVENTOR(S) | : Ken C. K. Cheung et al. |

It is certified that error appears in the above-identified patent and that said Letters Patent is hereby corrected as shown below:

In the Specification:

Column 1, line 5, insert the following paragraph:

--This invention was made with Government support under Contract No. F 49620-02-C-0031, awarded by the United States Air Force. The Government has certain rights in this invention.--

Signed and Sealed this
Seventh Day of October, 2014

Michelle K. Lee
*Deputy Director of the United States Patent and Trademark Office*